US007119921B2

(12) United States Patent
Kawasaki et al.

(10) Patent No.: US 7,119,921 B2
(45) Date of Patent: Oct. 10, 2006

(54) CARRIAGE SCANNING APPARATUS

(75) Inventors: Noriko Kawasaki, Tokyo (JP); Koh Hasegawa, Yokohama (JP); Hiroyuki Inoue, Yokohama (JP); Takashi Nojima, Tokyo (JP); Akira Kida, Kawasaki (JP); Takeshi Iwasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 09/730,574

(22) Filed: Dec. 7, 2000

(65) Prior Publication Data

US 2001/0015814 A1 Aug. 23, 2001

(30) Foreign Application Priority Data

Dec. 14, 1999 (JP) ................................ 11-353930

(51) Int. Cl.
*G06F 15/00* (2006.01)

(52) U.S. Cl. ......................................... 358/1.8; 347/32

(58) Field of Classification Search ................. 358/1.1, 358/1.8, 1.15, 1.4, 1.7, 1.12; 347/8, 32
See application file for complete search history.

(56) References Cited

U.S. PATENT DOCUMENTS

| | | | | |
|---|---|---|---|---|
| 4,640,634 | A | 2/1987 | Ozawa et al. | 400/144.2 |
| 4,781,552 | A * | 11/1988 | Malfit | 418/72 |
| 5,214,551 | A * | 5/1993 | Kaneda | 360/251.2 |
| 5,610,636 | A | 3/1997 | Hanabusa et al. | 347/8 |
| 5,882,005 | A * | 3/1999 | Araseki et al. | 271/126 |

FOREIGN PATENT DOCUMENTS

| | | |
|---|---|---|
| DE | 195 35 326 | 3/1997 |
| EP | 0 522 754 | 1/1993 |
| JP | 10-76731 | 3/1998 |
| WO | 89/09135 | 10/1989 |

OTHER PUBLICATIONS

Blaskovic et al., "Spring-Loaded Automatic Belt Tensioner", *IBM Technical Disclosure Bulletin,* vol. 24, No. 1A, Jun. 1981.

* cited by examiner

*Primary Examiner*—Gabriel Garcia
(74) *Attorney, Agent, or Firm*—Fitzpatrick, Cella, Harper & Scinto

(57) ABSTRACT

The present invention provides an apparatus having a carriage, in which, even when a toothed belt having a fine tooth pitch and low tooth height is used to drive the carriage, a jumping phenomenon of the toothed belt is positively prevented to thereby achieve stable scanning of the carriage without requiring a driving motor having a large capacity and an additional carriage position detecting device. A member for preventing the jumping of the toothed belt is disposed to create a predetermined gap with respect to a back surface of the toothed belt and is inclined with respect to the back surface by a predetermined angle at a position where the member is opposed to the back surface of a portion of the toothed belt to which the carriage is connected, in the vicinity of the driving pulley for the toothed belt connected to the carriage on which a head is mounted.

14 Claims, 5 Drawing Sheets

CARRIAGE SCANNING APPARATUS

BACKGROUND OF THE INVENTION

1. Field of the Invention

The present invention relates to an apparatus having a carriage, such as a recording apparatus, a reading apparatus or the like, in which a head member, such as recording means for effecting recording on a recording material or reading means for reading information held on an information holding medium such as an original, is mounted on a carriage so that the head member is reciprocally shifted along the recording material or the information holding medium.

2. Related Background Art

Among recording apparatuses having a printer function, a copying function or a facsimile function, or recording apparatuses used as output devices in composite electronic equipment or work stations including a computer or a word processor, or reading apparatuses used as input devices, there are apparatuses in which a recording head or a reading head such as a scanner is mounted on a carriage.

With this arrangement, in an apparatus of a serial type in which recording or reading is effected by main-scanning a sheet material such as a recording material or an original (information holding medium) in a direction transverse to a sheet conveying direction (sub-scanning direction), an image is formed (recording) or image information on the original is read by the recording means (recording head) or the reading means (reading head) mounted on the carriage shifted along the sheet material to complete one-line image formation or one-line image information reading and then the sheet material is fed by a predetermined amount (pitch conveyance as sub-scanning), and, by repeating such operations, an image is formed on the entire recording material or all the image information on the original is read.

In the above-mentioned apparatus of the serial type, by shifting the carriage on which the head member such as the recording head or the reading head is mounted along the sheet material in a scanning fashion and driving the head member synchronously with the scanning, the predetermined function of the head member, such as recording or reading, is effected.

For example, in order to obtain a highly fine output image by the recording apparatus of serial type, since the scanning timing of the carriage and the driving timing of the recording head must be matched with high accuracy, it is required that the scanning of the carriage be effected at a stable speed as much as possible. This is also true in the reading apparatus of a serial type.

To this end, there has been proposed a technique in which not only the function of the head member is controlled in response to a control signal for the scanning of the carriage, but also, by providing an encoder for detecting a position of the carriage during the scanning, the function of the head member is controlled synchronously with a detection timing of the encoder. However, such a technique tends to make the entire apparatus expensive and bulky.

Further, as scan driving force transmitting means for transmitting a driving force from a drive motor as a drive source to the carriage, a lead screw system and a toothed timing belt system are known. Recently, the toothed timing belt (toothed belt) has mainly been used in consideration of its low cost, ease of assembly and high accuracy. The toothed (timing) belt is suspended with predetermined tension between a driving pulley driven by a drive motor and an opposed idler pulley, and a driving force is transmitted by engagement between teeth provided on the driving pulley and teeth of the toothed belt. The carriage on which the head member is mounted is connected to the toothed belt so that it is reciprocally shifted between the pulleys as the drive motor is rotated.

For example, in the recording apparatus, as well as the recording head, ink storing means for storing ink required for image formation, means for supplying the ink to the recording head and recording head drive signal transmitting means may be provided on the carriage. Further, the carriage is supported and guided by a guide shaft or a guide rail provided substantially in parallel with the toothed belt, and the carriage is slidingly shifted on the supporting and guiding means (guide shaft or guide rail) in a condition that a load, such as the weight of the recording head, acts on the carriage. Thus, a predetermined drive transmitting force is required for the toothed belt.

In the conventional toothed belts, in order to ensure the predetermined drive transmitting force, the teeth of the toothed belt was made bulky to some extent and a height of each tooth (addendum) was increased. However, in the toothed belt having high addendum, when a tooth is engaged by a tooth of the driving pulley, vibration is generated in the toothed belt, thereby rendering the scanning speed of the carriage unstable. For this reason, in the recording apparatuses effecting highly accurate recording, carriage position detecting means such as an encoder is required, thereby preventing compactness, light weight and low cost of the apparatus.

On the other hand, when the driving force is transmitted by a toothed belt having small tooth pitch and low addendum in order to stabilize the scanning speed of the carriage, a tooth of the toothed belt floats off the driving pulley, thereby easily causing a jumping phenomenon in which idle rotation of the driving pulley is generated. In order to prevent the jumping phenomenon, it is effective to increase the tension on the toothed belt and/or to increase a diameter of the driving pulley. However, if the tension of the belt is increased, since the driving load is increased, it is required that a driving motor having large capacity be used, thereby increasing cost and making the apparatus bulky. On the other hand, if the diameter of the driving pulley is increased, similarly, the entire apparatus is made bulky. Further, since the greater the belt tension the greater the vibration caused by the engagement between the driving pulley and the belt, the effect of reduction in vibration obtained by reducing the addendum will be cancelled.

SUMMARY OF THE INVENTION

The present invention aims to eliminate the above-mentioned conventional drawbacks, and an object of the present invention is to provide an apparatus having a carriage, in which, even when a toothed belt having small tooth pitch and low addendum is used as driving transmitting means for transmitting a driving force to the carriage, a phenomenon such as a jumping phenomenon for releasing an engagement condition between the toothed belt and a driving pulley can be prevented, so that stable carriage scanning can be realized to effect highly fine recording without requiring a driving motor having large capacity and carriage position detecting means such as an encoder, thereby making the apparatus more compact and more light-weight and with reduced cost.

Another object of the present invention is to provide an apparatus, in which a head member is mounted on a carriage attached to a toothed belt extending between a driving pulley and an idler pulley so that scanning of the carriage is effected by driving the driving pulley to execute a function of the head member, and in which a jumping preventing member for preventing jumping of the toothed belt is provided at a position opposed to a back surface of the toothed belt in the vicinity of the driving pulley.

DESCRIPTION OF THE PREFERRED EMBODIMENTS

Figure 1:
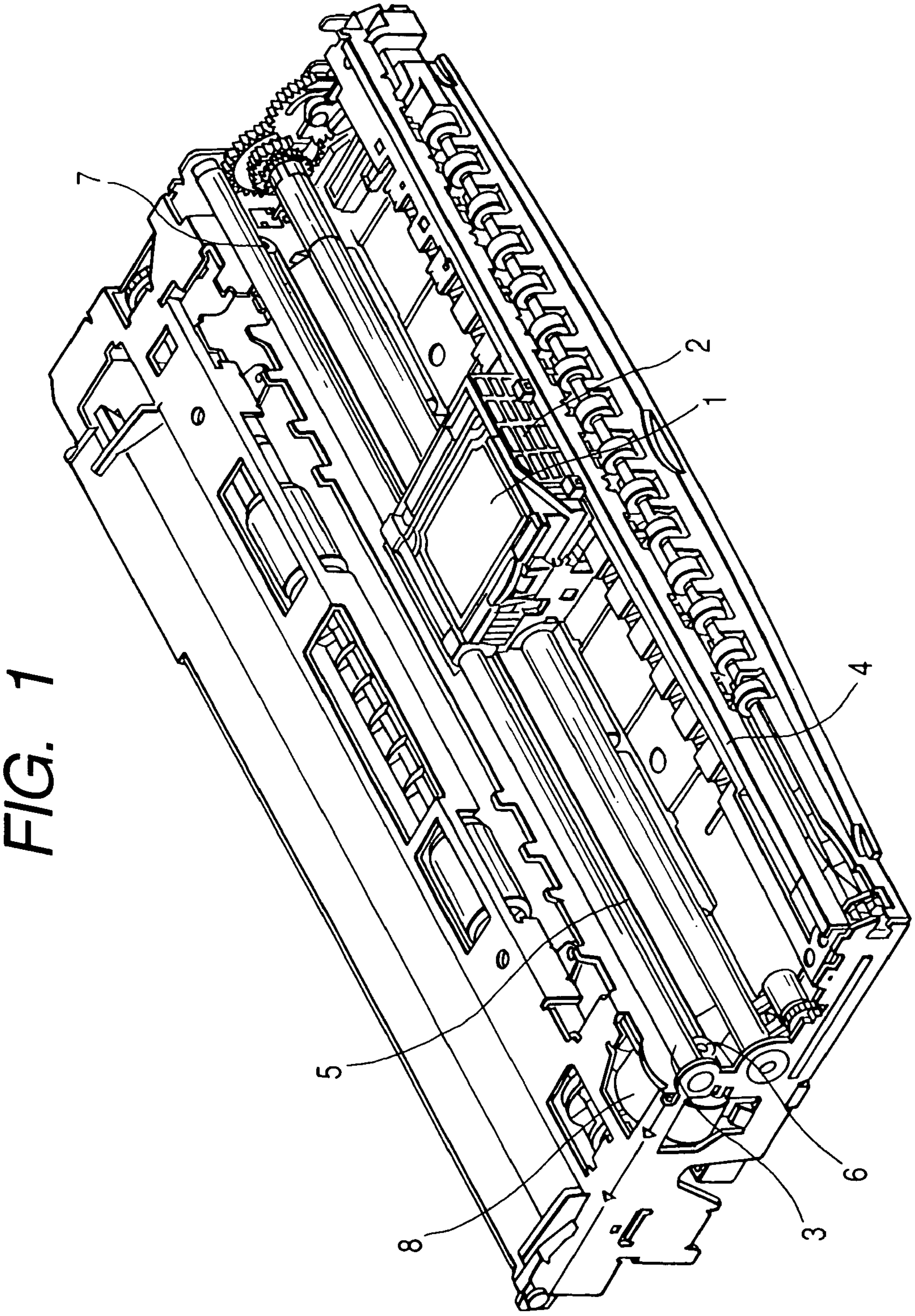
FIG. 1 is a schematic perspective view showing an embodiment of a recording apparatus to which the present invention is applied.

The present invention will now be explained in connection with embodiments thereof with reference to the accompanying drawings. FIG. 1 is a schematic perspective view showing an embodiment of a recording apparatus to which the present invention is applied. In FIG. 1, a carriage 2 on which recording means (recording head) 1 is mounted is guided and supported by a guide shaft 3 and a guide rail 4, and the carriage 2 is connected to a toothed belt 5 extending between a driving pulley 6 and an idler pulley 7. By rotating the driving pulley 6 by means of a driving motor 8, the carriage 2 is reciprocally shifted in a main scanning direction via the toothed belt 5. Further, by driving the recording head 1 in response to recording information synchronously with movement of the carriage 2 in the main scanning direction, recording can be effected on a recording material (not shown) such as a recording paper.

Incidentally, the present invention can similarly be applied to a reading apparatus in which a reading head is mounted on the carriage 2 and information held on an information holding medium such as an original from which information to be read (in place of the recording material) is read by the reading head.

Further, the recording head (recording means) 1 is a recording head of ink jet type in which ink is selectively discharged from a plurality of discharge ports by applying energy to the recording head in response to a recording signal. Further, the recording head 1 is ink jet recording means adapted to discharge the ink by utilizing thermal energy and having electrical/thermal converters for generating the thermal energy. Further, the recording head 1 serves to effect the recording by generating change in pressure caused by growth and contraction of a bubble created by film boiling due to the thermal energy applied by the electrical/thermal converter and by discharging the ink from the discharge port by utilizing the pressure change. The electrical/thermal converters are disposed in correspondence with the respective discharge ports so that the ink is discharged from a corresponding discharge port by applying pulse voltage to the corresponding electrical/thermal converter in response to the recording signal.

Figure 2:
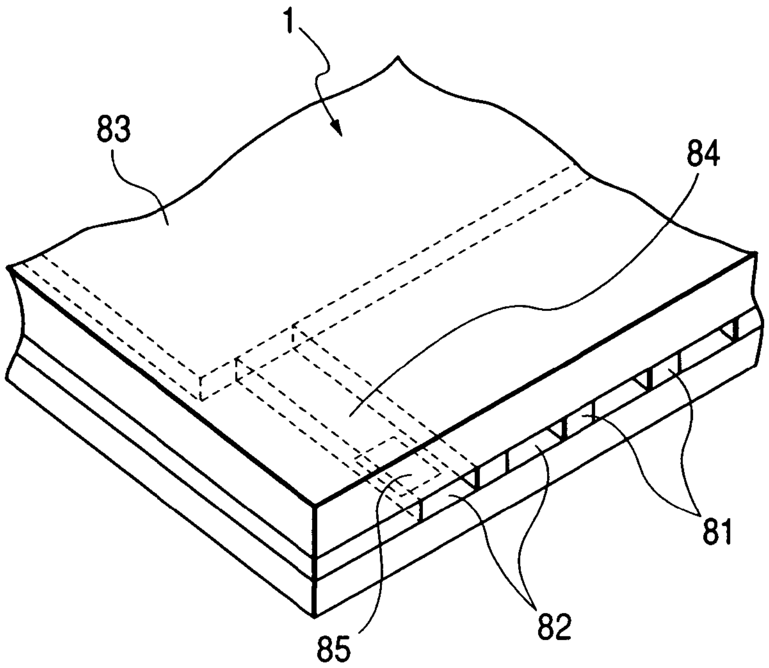
FIG. 2 is a partial perspective view schematically showing a structure of an ink discharging portion of recording means of FIG. 1.

FIG. 2 is a partial perspective view schematically showing a structure of an ink discharging portion (one discharge port array) of the recording means (recording head) 1. In FIG. 2, a discharge face 81 opposed to the recording material, such as a recording paper, with a predetermined gap (for example, about 0.3 to 2.0 mm) therebetween is provided with a plurality of discharge ports 82 arranged at a predetermined pitch, and the electrical/thermal converters (for example, heat generating resistors) 85 for generating ink discharging energy are disposed along wall surfaces of liquid paths 84 communicating the respective discharge ports 82 with a common liquid chamber 83. The recording head 1 is mounted in such a manner that the discharge ports 82 are lined along a direction transverse to the main scanning direction (shifting direction of the carriage 2 in the illustrated embodiment in which the recording head is mounted on the carriage 2). In this way, the recording head 1, in which the film boiling is generated in the ink within the liquid path 84 by driving the corresponding electrical/thermal converter 85 (by applying pulse voltage) in response to the image signal (recording signal) or discharge signal and the ink droplet is discharged from the corresponding discharge port 82 by the pressure caused by the film boiling, is provided.

Figure 3A:
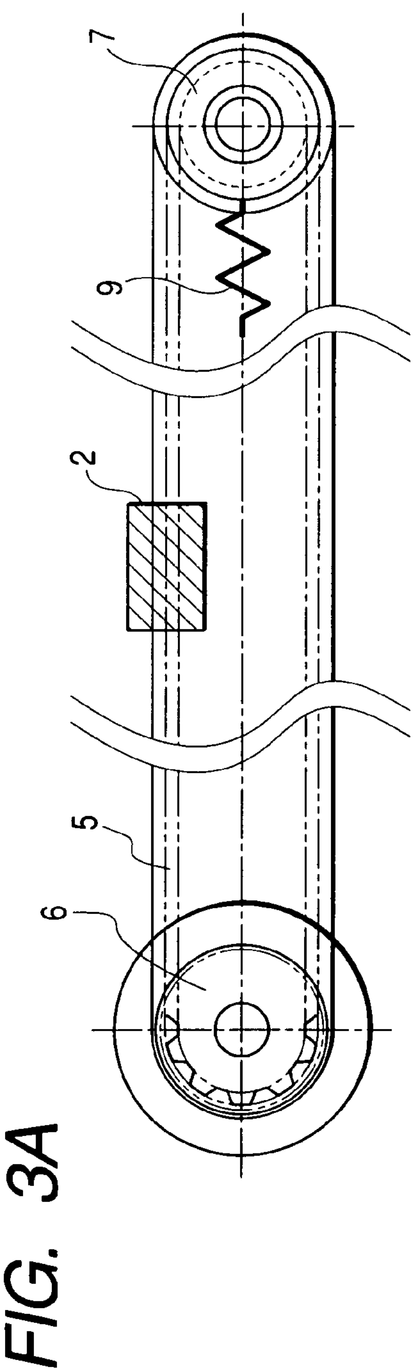
FIG. 3A is a side view showing comparison between a transmitting mechanism comprised of a toothed belt extending between a driving pulley and an idler pulley according to a conventional example.
Figure 3B:
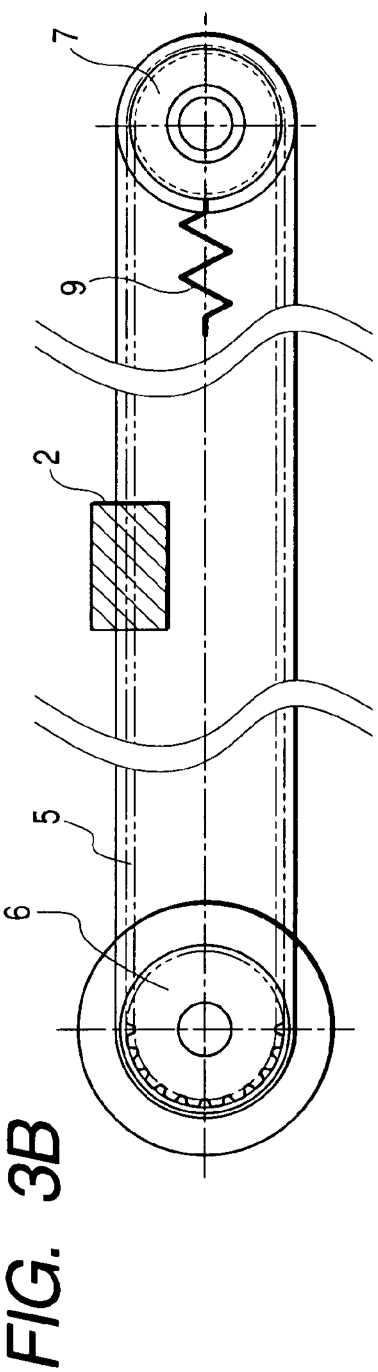
FIG. 3B is a side view showing comparison between a transmitting mechanism comprised of a toothed belt extending between a driving pulley and an idler pulley according to the embodiment of the present invention.

FIGS. 3A and 3B are side views showing a transmitting mechanism comprised of the toothed belt extending between the driving pulley and the idler pulley. FIG. 3A shows the transmitting mechanism in a conventional recording apparatus, and FIG. 3B shows the transmitting mechanism in an embodiment of a recording apparatus to which the present invention is applied (recording apparatus of FIG. 1). In the conventional example as shown in FIG. 3A, five teeth of a toothed belt 5 are meshed with a driving pulley 6 at a half circle (half of the complete circumference) thereof, while in the embodiment as shown in FIG. 3B, to which the present invention is applied, ten teeth of the toothed belt are meshed with the driving pulley 6 at a half circle (half of the complete circumference) thereof.

Namely, in the embodiment (FIG. 3B), the tooth pitch of the toothed belt 5 is about a half of the tooth pitch of the conventional toothed belt 5, and, regarding a height from a tooth tip to a tooth bottom of each tooth of the toothed belt 5 (distance between the tooth tip of the toothed belt 5 and the tooth tip of the driving pulley 6), the height in the embodiment (FIG. 3B) to which the present invention is applied is reduced to about 60% of the height in the conventional example (FIG. 3A). The embodiment to which the present invention is applied and shown in FIG. 3B differs from the conventional example shown in FIG. 3A regarding the tooth pitch of the toothed belt 5 and the driving pulley 6 as mentioned above, but the other structures are substantially the same between both.

In FIGS. 3A and 3B, the idler pulley 7 is suspended by a chassis (not shown) via a tension spring 9. Namely, by biasing the idler pulley 7 to the right by an elastic force of the tension spring 9, tension is applied to the toothed belt 5. As another structure for holding such an idler pulley, although there is a structure in which tension is maintained on the toothed belt by positioning and securing the idler pulley to the chassis in a condition that tension is previously applied to the toothed belt by pulling the idler pulley, in such a structure, if the toothed belt is expanded or contracted due to change in temperature and/or humidity, since the tension of the toothed belt is greatly changed, it is required that the tension of the toothed belt is previously set to a higher value, and, thus, the electrical power required for driving the carriage is increased.

In FIGS. 3A and 3B, in the embodiment to which the present invention is applied, as shown, the carriage 2 is attached to an upper run of the toothed belt 5. Accordingly, when the driving pulley 6 is driven in an anti-clockwise direction in FIGS. 3A and 3B, the carriage 2 is directly pulled by the toothed belt 5 to be shifted toward the driving pulley 6. On the other hand, when the driving pulley 6 is rotated in a clockwise direction, the carriage 2 is pulled by the toothed belt through the idler pulley 7 to be shifted toward the idler pulley 7.

However, as mentioned above, since the idler pulley 7 is suspended via the tension spring 9, when the driving pulley 6 is rotated in the clockwise direction, immediately after the rotation is started, the carriage 2 is temporarily stopped due to sliding inertia acting between the carriage and the guide shaft 3 and/or the guide rail 4; meanwhile, the idler pulley 7 is slightly shifted toward the driving pulley 6 by the pulling action. Meanwhile, since the driving pulley 6 continues to rotate, an excessive portion of the toothed belt generated by reduction of the distance between the idler pulley 7 and the driving pulley 6 is shifted toward the upper run of the belt, thereby trying to flex the belt portion between the driving pulley 6 and the carriage 2 now stopped.

In this case, since the toothed belt 5 has some uniform rigidity, the belt portion between the driving pulley 6 and the carriage 2 is not flexed partially but is flowing above the driving pulley 6. In this case, since the driving pulley 6 still continues to rotate, the driving pulley 6 tries to rotate idly with respect to the toothed belt 5. Such a phenomenon is referred to as a jumping phenomenon.

Here, as in the conventional example shown in FIG. 3A, when the height from the tooth tip of the toothed belt 5 and the tooth tip of the driving pulley 6 is sufficiently great, even if the toothed belt 5 is slightly floating, the tooth tip of the belt is not dislodged from the tooth tip of the driving pulley 6 and idle rotation of the driving pulley 6 does not occur. However, as in the present embodiment to which the present invention is applied and shown in FIG. 3B, if any means for preventing the jumping of the toothed belt 5 such as a jumping preventing member 10 (FIGS. 4, 5A and 5B; described later) is not provided, the possibility of occurrence of idle rotation of the driving pulley 6 will be increased.

Figure 4:
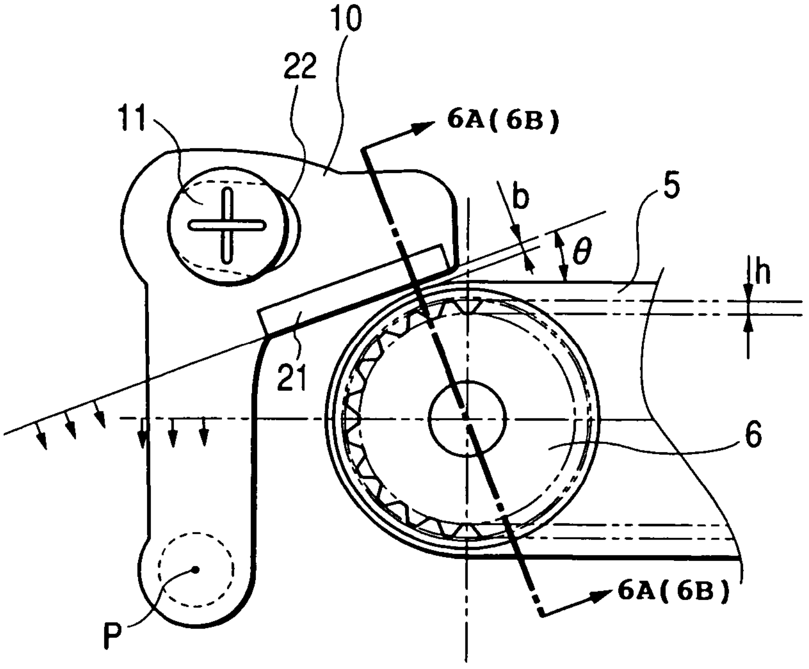
FIG. 4 is a partial side view showing a jumping preventing member in the embodiment of the recording apparatus to which the present invention is applied.

FIG. 4 is a partial side view showing a construction of the jumping preventing member 10 for preventing the jumping of the toothed belt 5 in the recording apparatus according to the embodiment to which the present invention is applied. In FIG. 4, the jumping preventing member 10 has a jumping preventing surface 21 spaced apart from a back surface of the toothed belt 5 by a predetermined distance b. In the arrangement shown in FIG. 3B, as mentioned above, since the floating of the toothed belt 5 occurs in the upper run of the belt to which the carriage 2 is attached when the carriage 2 is shifted away from the driving pulley 6 by rotating the driving pulley 6 in the clockwise direction, the jumping preventing member (jumping preventing plate) 10 according to the present invention is disposed above the driving pulley 6.

Figure 5A:
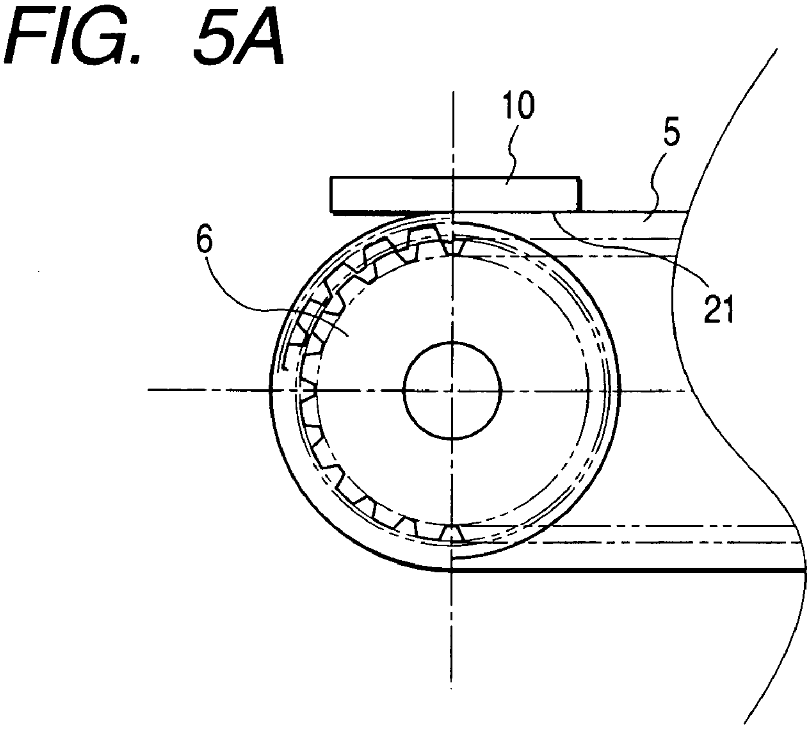
FIG. 5A is a partial side view showing a condition that the toothed belt abuts against a horizontal jumping preventing member.
Figure 5B:
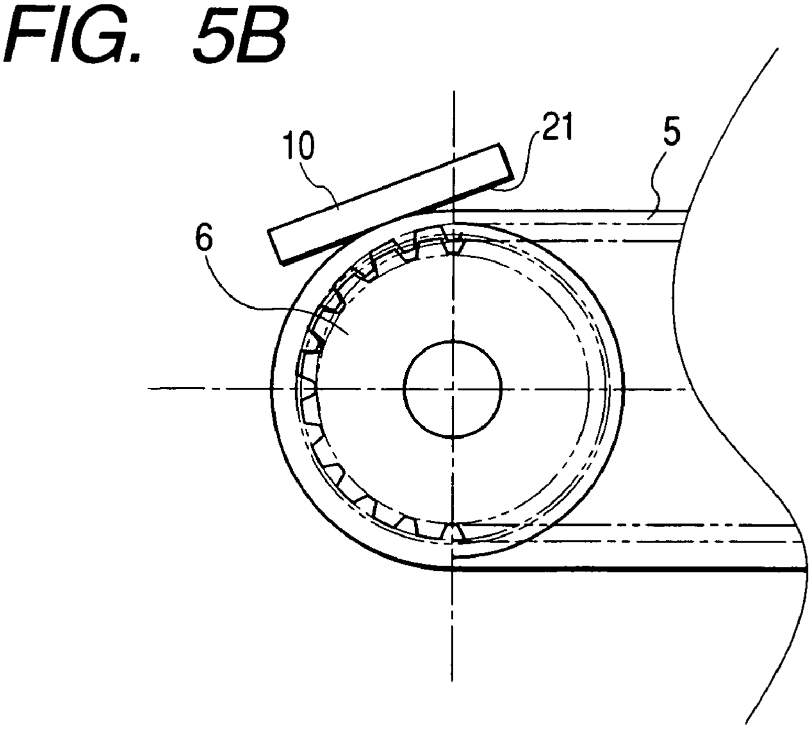
FIG. 5B is a partial side view showing a condition that the toothed belt abuts against an inclined jumping preventing member.

FIGS. 5A and 5B are partial side views showing a condition that the toothed belt 5 abuts against the jumping preventing member 10 (jumping preventing surface 21), where FIG. 5A shows a condition that the preventing surface 21 of the jumping preventing member 10 is located substantially in parallel with the shifting direction of the toothed belt 5 and FIG. 5B shows a condition that the jumping preventing member 10 is located in such a manner that the preventing surface becomes nearest to the back surface of the toothed belt at the left side of a position where the toothed belt 5 leaves the driving pulley 6. FIG. 5B shows the most preferred embodiment of the present invention.

As shown in FIG. 5A, when the jumping preventing member 10 is located substantially in parallel with the toothed belt normally extended, since the toothed belt 5 is floating greatly at a position where the toothed belt contacts the jumping preventing member 10, great frictional load is generated between the back surface of the toothed belt 5 and the jumping preventing member 10 (jumping preventing surface 21), thereby increasing resistance against the shifting (movement) of the toothed belt 5. Consequently, the toothed belt 5 tends to be floating relatively greatly at the left side of the jumping preventing member 10, with the result that the tooth tip of the toothed belt 5 is disengaged from the tooth tip of the driving pulley 6 thereby to cause the idle rotation of the driving pulley.

To the contrary, as shown in FIG. 5B, when the jumping member 10 is located in such a manner that the preventing surface becomes nearest to the back surface of the toothed belt at the left side of the position where the toothed belt 5 leaves the driving pulley 6, since the toothed belt 5 is not floating so greatly at the position where the toothed belt contacts the jumping preventing member 10, the frictional load between the back surface of the toothed belt 5 and the jumping preventing member 10 does not become so great, and, accordingly, the resistance against the shifting (movement) of the toothed belt 5 is relatively small.

Further, as shown in FIGS. 4, 5A and 5B, when the jumping preventing member 10 for preventing the jumping of the toothed belt is located at the position where the jumping preventing member is opposed to the back surface of the toothed belt 5 in the vicinity of the driving pulley 6, during the operation of the recording apparatus, since the toothed belt 5 abuts against the jumping preventing member 10 (preventing surface 21 thereof) repeatedly, the toothed belt 5 is damaged repeatedly. In order to prevent wear and/or breaking of the toothed belt 5 due to such repeated damage, as shown in FIG. 4, the jumping preventing member 10 has a surface which forms an angle θ with respect to an extension line of the upper run of the toothed belt 5 and which extends in a tangential direction of the driving pulley 6 at the contact (nearest) position between the jumping preventing member and the toothed belt 5 so that a larger area of the back surface of the toothed belt 5 floating from the driving pulley 6 contacts the jumping preventing member 10.

Further, by providing the jumping preventing surface 21 having the above-mentioned inclination on the jumping preventing member 10, the jumping preventing member can also act as a guide plate for stabilizing the advancing direction of the toothed belt 5 leaving the driving pulley 6. In the recording apparatus according to the illustrated embodiment having the jumping preventing member 10 as shown in FIG. 4, the angle θ between the jumping preventing surface 21 of the jumping preventing member 10 and the extension line of the upper run of the toothed belt is selected to have a range from about 10 degrees to about 30 degrees. Although depending upon the scanning speed, weight and sliding load of the carriage 2, normally, when the angle θ is about 20 degrees, the greatest jumping preventing effect can be achieved.

In FIG. 4, although the distance b between the jumping preventing member 10 and the back surface of the toothed belt 5 should be smaller than the height h of the tooth of the toothed belt 5, in practice, even if the distance b is made slightly smaller than the tooth height h, an adequate jumping preventing effect may not be obtained. The reason is that, since the flexion of the toothed belt 5 is transmitted from the carriage 2 side to the driving pulley 6 side with cord vibration, depending upon the phase of the tooth of the toothed belt 5, the floating portion of the toothed belt 5 is shifted while passing through the gap between the toothed belt and the jumping preventing member 10, with the result that the idle rotation of the driving pulley 6 may occur at the left side of the jumping preventing member 10. In the recording apparatus according to the illustrated embodiment, the distance b between the jumping preventing member 10 and the back surface of the toothed belt 5 is selected to be greater than 10% and smaller than 90% of the tooth height h of the toothed belt 5.

Further, regardless of the rotational direction of the driving pulley 6, during the rotation of the driving pulley 6, the toothed belt 5 is floating slightly more than when the driving pulley 6 is stopped. Although the floating amount is smaller than the floating amount upon occurrence of the jumping, if the jumping preventing member 10 is located immediately in the vicinity of the back surface of the toothed belt 5, even when there is no danger of the jumping occurring, the toothed belt 5 will always slidingly contact the jumping preventing member 10. Thus, if the distance b between the jumping preventing member 10 and the back surface of the toothed belt 5 is too small, not only will the toothed belt 5 be worn, but also the rotational load of the driving pulley 6 will be increased or the scanning speed of the carriage 2 will be made unstable.

Accordingly, it is desirable that the distance b between the jumping preventing member 10 and the back surface of the toothed belt 5 be selected to a value for always maintaining a slight gap so that the toothed belt 5 is not contacted with the jumping preventing member 10 by the slight floating during the normal rotation. In the recording apparatus according to the illustrated embodiment, the distance b is selected to be about 10% or more (however, smaller than 90%) of the tooth height h of the toothed belt 5. As mentioned above, in order to achieve the positive jumping preventing effect of the toothed belt 5, the distance b between the jumping preventing member 10 and the back surface of the toothed belt 5 is required to be selected to be within the aforementioned predetermined range. In the recording apparatus according to the illustrated embodiment, since the tooth height h of the toothed belt 5 is small, the allowable range of the distance b is very small, such as 0.3 mm or less.

Further, as to the toothed belt 5, depending upon the manufacturing method therefor, it is inevitable that there is dispersion in height of the back surface of the toothed belt when the belt is wrapped around the driving pulley 6. In this case, it is possible to eliminate such dispersion by polishing the back surface after the manufacture of the toothed belt 5. However, since dispersion in other parts is also added, it is desirable that the jumping preventing member 10 be positioned while adjusting the distance between the jumping preventing member and the toothed belt 5.

Now, an embodiment of an adjusting mechanism (adjusting method) for adjusting the distance b between the jumping preventing member 10 and the back surface of the toothed belt 5 will be explained with reference to FIG. 4. In FIG. 4, regarding the arrangement of the jumping preventing member 10, as mentioned above, not only the distance b between the jumping preventing member and the back surface of the toothed belt 5, but also the angle θ with respect to the straight run of the toothed belt 5 are important. Thus, in the adjustment of the distance b, it is required that the angle θ is changed as little as possible. Further, in the arrangement shown in FIG. 4, the jumping preventing member 10 is repeatedly subjected to a force directing away from the driving pulley 6 due to the contact between the jumping preventing member and the toothed belt 5. If the jumping preventing member 10 is shifted by this force to increase the distance b, the jumping preventing effect will be reduced. To avoid this, the jumping preventing member 10 must be secured positively.

In FIG. 4, the jumping preventing member 10 is attached via boss-fitting for rotation around a point P. The point P is located nearer to the driving pulley 6 than the extension direction of the jumping preventing surface 21 of the jumping preventing member 10 and below the center of the driving pulley 6. As a result, even when the distance b is adjusted by rotating the jumping preventing member 10 around the point P, the angle θ is almost not changed.

Further, an elongated hole 22 for adjusting the distance b is formed in the jumping preventing member 10, so that the jumping preventing member is secured to a chassis (not shown) by a screw 11 passing through the elongated hole. Since the securing screw 11 is located in the vicinity of the contact position (or most adjacent position) between the jumping preventing member 10 and the toothed belt 5, the jumping preventing member 10 is not shifted by the urging force of the toothed belt 5. Incidentally, normally, in many cases, since the driving pulley 6 is secured to an output shaft of a driving motor 8 (FIG. 1), there is a greater possibility that the securing position of the jumping preventing member 10 is situated in the vicinity of the driving motor 8. Thus, in order to not generate the positional deviation of the jumping preventing member (jumping preventing surface 21) due to heat from the driving motor 8, it is desirable that the jumping preventing member 10 is made of material which is hard to be deformed by heat.

Figure 6B:
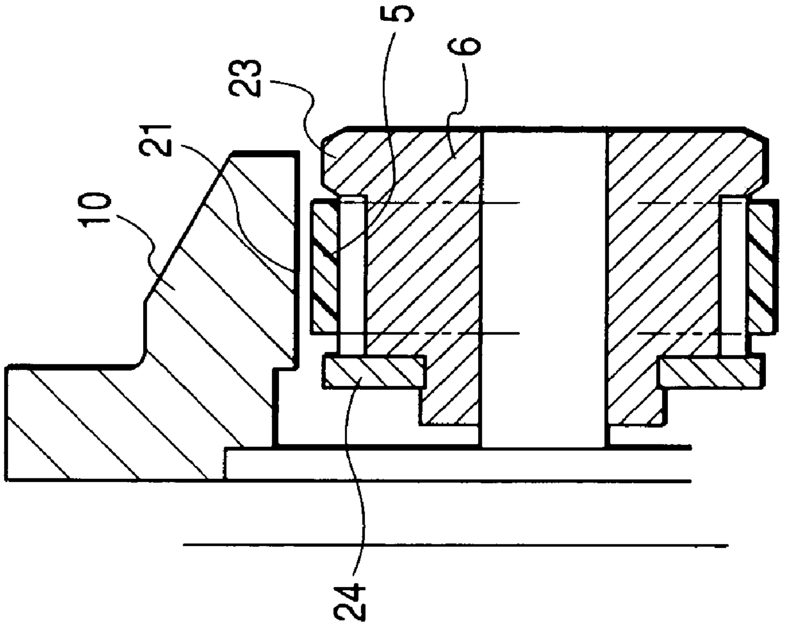
FIG. 6B is a partial sectional view showing characteristic structures according to the embodiment of the present invention, taken along the line 6A(6B)–6A(6B) in FIG. 4.
Figure 6A:
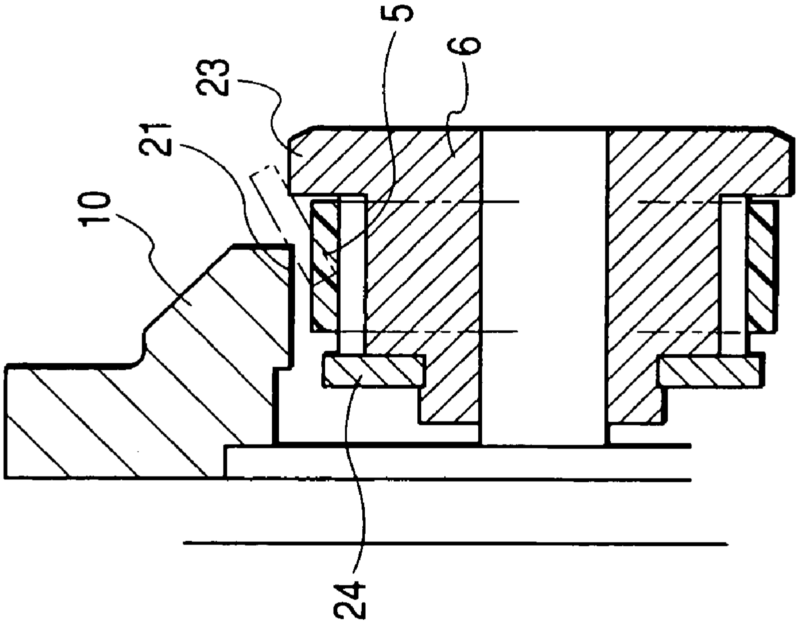
FIG. 6A is a partial sectional view showing characteristic structures according to the reference example, taken along the line 6A(6B)–6A(6B) in FIG. 4.

FIGS. 6A and 6B are partial sectional views taken along the line 6A(6B)–6A(6B) in FIG. 4, showing a positional relationship between the toothed belt 5, driving pulley 6 and jumping preventing member 10, where FIG. 6A shows a reference example and FIG. 6B shows an arrangement example according to the embodiment of the present invention. In FIGS. 6A and 6B, flanges 23, 24 for regulating deviation of the toothed belt 5 in a width-wise direction are provided on the driving pulley 6 on both sides thereof corresponding to both width-wise sides of the toothed belt 5. As shown in FIG. 6A, when at least one (23) of the flanges has a height greater than the height of the back surface of the toothed belt 5 mounted on the driving pulley 6, the jumping preventing member 10 cannot be positioned to cover the flange 23 in order to prevent the interference with the flange 23. Namely, the jumping preventing member 10 cannot cover the entire back surface of the toothed belt 5 along the width-wise direction thereof.

Thus, in the reference example shown in FIG. 6A, in a condition that the driving motor 8 and the driving pulley 6 are stopped, when instantaneous shock (for example, due to dropping) is applied to the apparatus to generate a force trying to shift the carriage 2 in the scanning direction, if the toothed belt 5 is loosened, the toothed belt 5 may be dislodged from the driving pulley 6. Namely, in the arrangement shown in FIG. 6A, since the jumping preventing member 10 covers the toothed belt 5 only partially in the width-wise direction, a great gap is created between the jumping preventing member 10 and the flange 23 of the driving pulley 6, with the result that, as shown by the phantom line, the toothed belt 5 may be dislodged from the driving pulley 6 by passing through such a gap in an oblique direction.

To the contrary, in the arrangement according to the embodiment of the present invention shown in FIG. 6B, since outer diameters of the flanges 23, 24 provided on the driving pulley 6 at the positions corresponding to both width-wise sides of the toothed belt 5 are selected to be smaller than the height of the back surface of the toothed belt 5 mounted on the driving pulley 6 and the jumping preventing member 10 is extended to cover both of the flanges 23, 24 and the jumping preventing surface 21 is located in the vicinity of the back surface of the toothed belt 5, the gaps between the jumping preventing member 10 and both flanges 23, 24 of the driving pulley 6 can be made sufficiently small, with the result that, for example, if instantaneous shock (for example, due to dropping) is applied to the apparatus to generate a force trying to shift the carriage 2 in the scanning direction, the toothed belt 5 can positively be prevented from dislodging from the driving pulley.

Incidentally, in the above-mentioned embodiment of the present invention, while an example that the abutment portion (preventing portion) of the jumping preventing member 10 is formed as a flat plate in order to avoid the interference with the carriage 2 and the guide shaft 3 was explained, so long as adequate space can be utilized, in place of the flat plate, a rotatable roller may be used. By using the rotatable roller as the jumping preventing member, even when the distance b between the roller and the back surface of the toothed belt 5 is selected to be smaller, increase in load due to the sliding friction between the toothed belt 5 and the jumping preventing member can be prevented, thereby realizing a more positive jumping preventing effect.

According to the above-mentioned embodiment, in the recording apparatus in which the recording means 1 is mounted on the carriage 2 attached to the toothed belt 5 extending between the driving pulley 6 and the idler pulley 7 and the recording is effected on the recording material by effecting the scanning of the carriage 2 by driving the driving pulley 6, since the jumping preventing member 10 for preventing the jumping of the toothed belt 5 is provided to be opposed to the back surface of the toothed belt 5 in the vicinity of the driving pulley 6, even when the toothed belt 5 having fine tooth pitch and low tooth height is used as the driving transmitting means for the carriage 2, the tendency of the back surface of the toothed belt 5 to float from the driving pulley 6 upon the rotation of the latter is prevented by the jumping preventing member 10, with the result that the idle rotation of the driving pulley 6 is prevented and the jumping phenomenon of the toothed belt 5 can be prevented.

Therefore, according to the above-mentioned embodiment, even when the toothed belt having fine tooth pitch and low tooth height is used as the driving transmitting means for the carriage 2, the jumping phenomenon of the toothed belt 5 can be prevented with a simple construction, and, thus, stable scanning of the carriage can be realized without requiring a large capacity driving motor and a carriage position detecting means such as an encoder, thereby achieving highly fine recording, and thereby providing an apparatus, such as a recording apparatus or a reading apparatus, which can be made cheaper and more compact.

Further, in the above-mentioned embodiment, since the driving pulley 6 is rotatingly driven by the driving motor 8, the tension spring 9 is provided for applying the tension to the toothed belt 5 by biasing the idler pulley 7 by the elastic force, and the jumping preventing member 10 is located in a confronting relationship to the upper run of the toothed belt 5 to which the carriage 2 is attached in such a manner that the jumping preventing member 10 is nearest to the back surface of the toothed belt 5 at the position where the toothed belt 5 is engaged by the driving pulley 6 rather than the position where the toothed belt 5 leaves the driving pulley 6 in the condition that the driving pulley 6 is stopped, even when the toothed belt having fine tooth pitch and low tooth height is used as the driving transmitting means for the carriage 2, the jumping phenomenon of the toothed belt 5 can be prevented more efficiently with a simple construction, and, thus, stable scanning of the carriage can be realized without requiring a large capacity driving motor and a carriage position detecting means such as an encoder, thereby achieving highly fine recording, and thereby providing an apparatus, such as a recording apparatus or a reading apparatus, which can be made cheaper and more compact.

Further, according to the above-mentioned embodiment, since the jumping preventing member 10 has the jumping preventing surface 21 located at the position nearest to the back surface of the toothed belt 5 and extending in the tangential direction of the driving pulley 6, the surface 21 is inclined with respect to the straight upper run of the toothed belt by an angle of about 10 to 30 degrees, and the distance b between the jumping preventing member 10 and the back surface of the toothed belt 5 is selected to be greater than 10% and smaller than 90% of the tooth height of the toothed belt, the above-mentioned effects can be achieved more efficiently.

Further, according to the above-mentioned embodiment, since the jumping preventing member 10 is rotatably supported for rotation around the position P nearer to the driving pulley 6 than the extension line of the jumping preventing surface 21 of the jumping preventing member 10 at the side opposite to the nearest position between the jumping preventing member and the toothed belt 5 with respect to the driving pulley 6 and is secured to the position in the vicinity of the nearest position, the driving pulley 6 has the flanges 23, 24 at the positions corresponding to both width-wise sides of the toothed belt 5, the outer diameters of the flanges are selected to be smaller than the height of the back surface of the toothed belt 5 mounted on the driving pulley 6, and the jumping preventing member 10 has the jumping preventing surface 21 adjacent to the toothed belt 5 to cover both flanges 23, 24 of the driving pulley 6 at least partially, an apparatus, such as a recording apparatus or a reading apparatus, in which the above-mentioned effects are achieved more efficiently, can be provided.

Incidentally, in the above-mentioned embodiment, while an example that the recording apparatus has the ink jet recording head as the recording means (recording head) was explained, the present invention can similarly be applied to other recording apparatuses, such as wire dot type, thermal type, laser beam type and the like, to achieve similar effects. Further, the present invention is not limited to the recording apparatus having the single recording means, but can similarly be applied to a color recording apparatus using a plurality of recording heads for effecting recording with plural colors or a gradation recording apparatus using a plurality of recording heads for effecting recording with same color and with different densities or a combination thereof to achieve similar effects.

Further, in the ink jet recording apparatus, the present invention can be applied to any arrangements, such as an arrangement in which an ink cartridge integrally including a recording head and an ink tank is used, an arrangement in which an ink cartridge is integrally incorporated in a carriage or an arrangement in which recording means (recording head) and an ink tank are provided separately and are interconnected through an ink supplying tube, thereby achieving similar effects. Further, the present invention can be applied to the ink jet recording apparatus in which recording means utilizing electrical/mechanical converters, such as piezo-electric elements, are used.

What is claimed is:

1. An apparatus having a carriage to which a head member is mounted, said carriage comprising:

a toothed belt extending between a driving pulley and an idler pulley, the carriage being attached to said toothed belt; and preventing means for preventing idle rotation of said driving pulley with respect to said toothed belt, said preventing means comprising a jumping preventing surface provided in the vicinity of said driving pulley and opposed to a back surface of said toothed belt.

2. An apparatus according to claim 1, wherein said driving pulley is rotatingly driven by a driving motor.

3. An apparatus according to claim 1, wherein said idler pulley is elastically biased by a tension spring in order to apply tension to said toothed belt.

4. An apparatus according to claim 1, wherein said jumping preventing surface of said preventing means is opposed to a portion of said toothed belt to which the carriage is attached.

5. An apparatus according to claim 1, wherein said jumping preventing surface of said preventing means is disposed nearest to the back surface of said toothed belt at a position where said toothed belt is engaged by said driving pulley rather than a position where said toothed belt leaves said driving pulley in a condition that said driving pulley is stopped.

6. An apparatus according to claim 1, wherein said jumping preventing surface of said preventing means extends in a tangential direction of said driving pulley at a position where said jumping preventing surface of said preventing means is nearest to the back surface of said toothed belt, and said jumping preventing surface is inclined with respect to a straight run portion of said toothed belt by an angle greater than 10 degrees and smaller than 30 degrees.

7. An apparatus according to claim 1, wherein a distance between said jumping preventing surface of said preventing means and the back surface of said toothed belt is selected to be in a range between 10% and 90% of a tooth height of said toothed belt.

8. An apparatus according to claim 6, wherein said jumping preventing surface of said preventing means is rotatably supported for rotation around a position nearer to said driving pulley than an extension direction of said jumping preventing surface of said preventing means at a side opposite to the nearest position between said driving pulley and said toothed belt.

9. An apparatus according to claim 1, wherein said driving pulley has flanges at sides corresponding to both width-wise sides of said toothed belt, and diameters of said flanges are smaller than a height of the back surface of said toothed belt mounted around said driving pulley, and said jumping preventing surface of said preventing means approaches said toothed belt in a range where said jumping preventing surface covers said flanges at least partially.

10. An apparatus according to claim 1, wherein said head member comprises a recording head for effecting recording on a recording material.

11. An apparatus according to claim 10, wherein said recording head is an ink jet recording head for effecting the recording by discharging ink from a discharge port.

12. An apparatus according to claim 11, wherein said recording head has an electrical/thermal converter for generating thermal energy used for discharging the ink.

13. An apparatus according to claim 12, wherein said recording head discharges the ink from said discharge port by utilizing film boiling caused in the ink by the thermal energy generated by said electrical/thermal converter.

14. An apparatus according to claim 1, wherein said head member comprises a reading head for reading information on an information holding medium.

* * * * *